(12) United States Patent
Taylor

(10) Patent No.: US 6,601,600 B1
(45) Date of Patent: Aug. 5, 2003

(54) ANNULAR FLUID MANIPULATION IN LINED TUBULAR SYSTEMS TO ENHANCE COMPONENT MECHANICAL PROPERTIES AND FLOW INTEGRITY

(75) Inventor: Jack Curtis Taylor, Conroe, TX (US)

(73) Assignee: Safetyliner Systems, LLC, Conroe, TX (US)

( * ) Notice: Subject to any disclaimer, the term of this patent is extended or adjusted under 35 U.S.C. 154(b) by 0 days.

(21) Appl. No.: 10/018,147
(22) PCT Filed: Jun. 13, 2000
(86) PCT No.: PCT/US00/16258
  § 371 (c)(1),
  (2), (4) Date: May 21, 2002
(87) PCT Pub. No.: WO00/77587
  PCT Pub. Date: Dec. 21, 2000

Related U.S. Application Data
(60) Provisional application No. 60/138,814, filed on Jun. 14, 1999.

(51) Int. Cl.[7] ................................................. F17D 1/00
(52) U.S. Cl. ................................. 137/15.04; 137/15.05; 137/312; 138/114
(58) Field of Search ........................... 137/15.04, 15.05, 137/312; 138/114

(56) References Cited

U.S. PATENT DOCUMENTS

| | | | |
|---|---|---|---|
| H594 H | 3/1989 | Adorjan | 138/148 |
| 4,915,121 A | 4/1990 | Rains | 138/148 |

*Primary Examiner*—Gerald A. Michalsky
(74) *Attorney, Agent, or Firm*—Ostrolenk, Faber, Gerb & Soffen, LLP

(57) ABSTRACT

A method of treating fluids in an annulus (18), comprising the steps of: providing a fluid-circulation annulus (18) between a host tubular (10) and a liner (17) therein; and manipulating fluids in the annulus (18) so that the relative proportions of fluid components in the annular fluid correspond to the relative permeation rates of the fluid components from the bore to the annulus (18). The method may further comprise the steps of: detecting an undesired fluid in the annulus (18); and manipulating the annular fluids in response to the undesired fluid, so that the relative proportions of fluid components in the annular fluid, including the undesired fluid, correspond to the relative permeation rates of the fluid components from the bore to the annulus (18). In a case where the undesired fluid has potential for harm to the host tubular (10), the manipulating step may reduce the potential for harm.

32 Claims, 15 Drawing Sheets

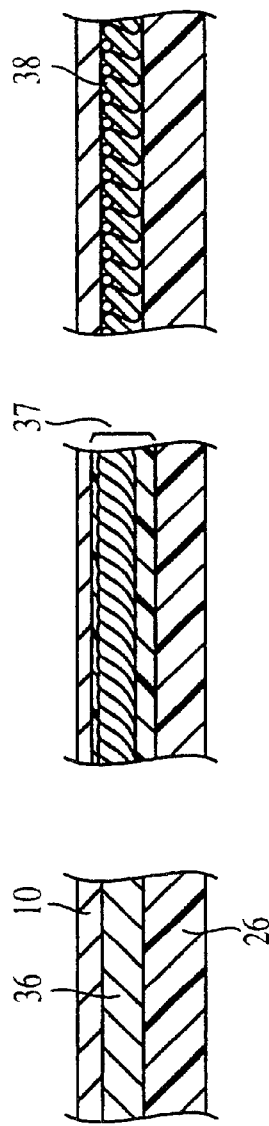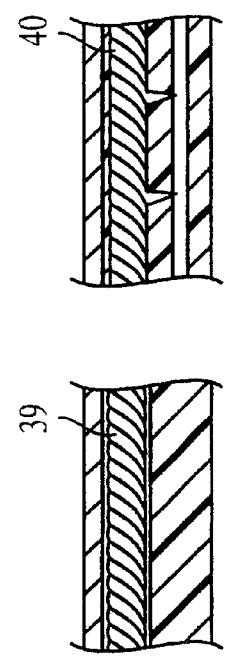
FIG. 9c
FIG. 9e
FIG. 9b
FIG. 9d
FIG. 9a

OPERATING CONDITIONS WITHOUT ANNULAR HEAT INPUT

– – – ANNULAR FLUID
———— BORE FLUID

OPERATING CONDITIONS WITH ANNULAR HEAT INPUT

– – – ANNULAR FLUID
———— BORE FLUID

SHUTDOWN CONDITION

– – – ANNULAR FLUID
———— BORE FLUID

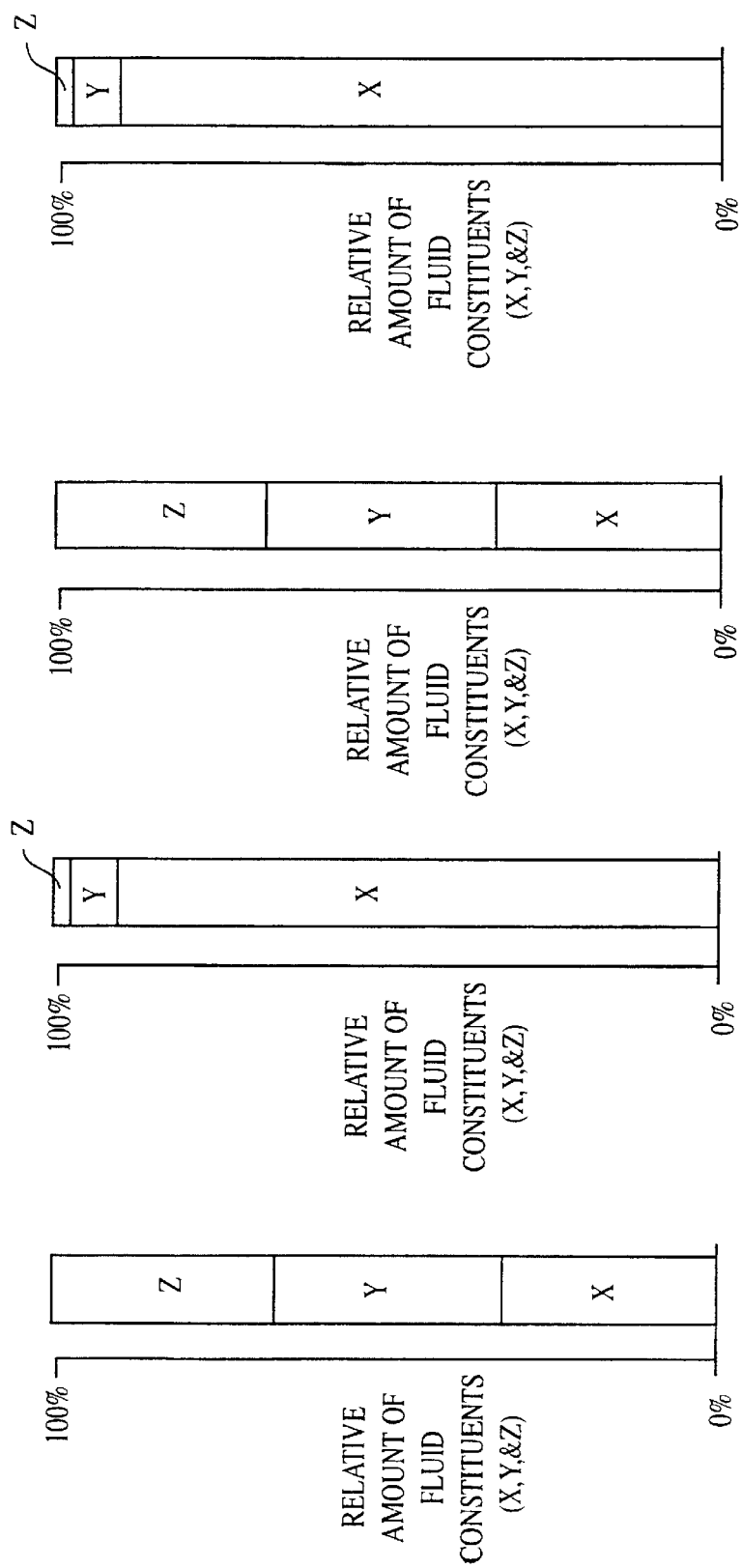

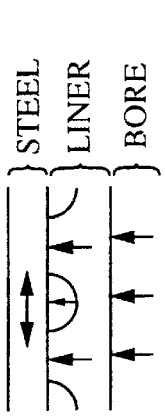
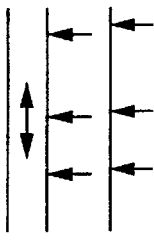
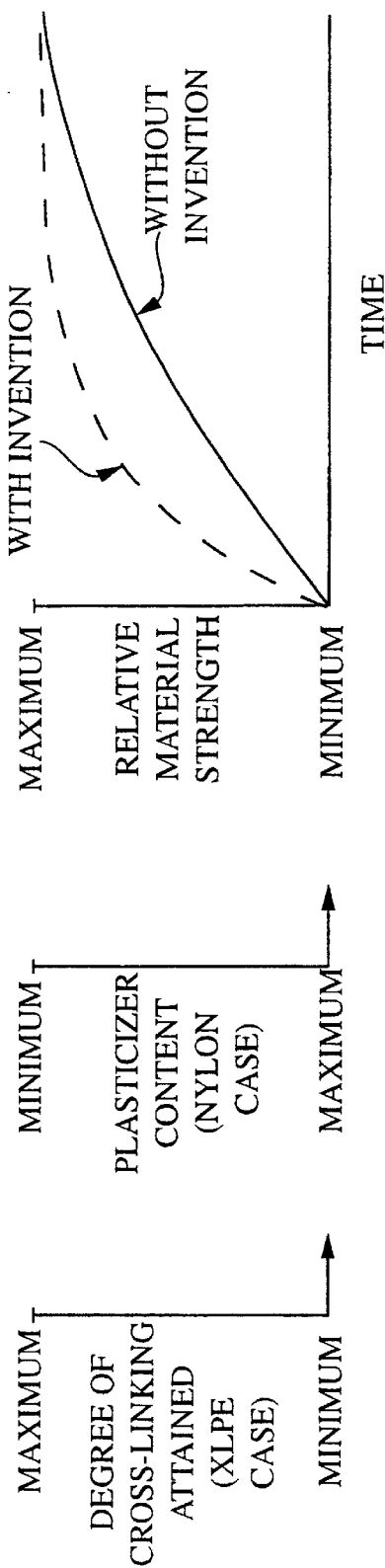
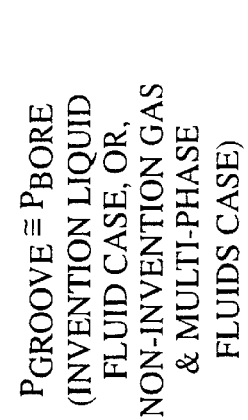

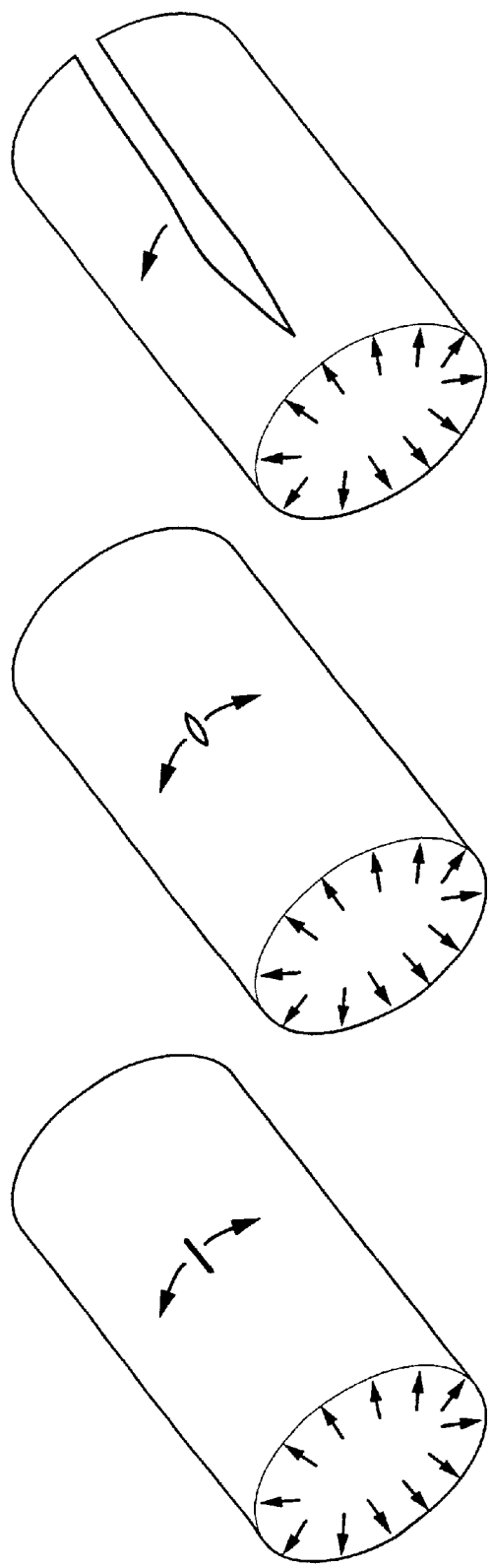

US 6,601,600 B1

ANNULAR FLUID MANIPULATION IN LINED TUBULAR SYSTEMS TO ENHANCE COMPONENT MECHANICAL PROPERTIES AND FLOW INTEGRITY

CROSS-REFERENCE TO RELATED APPLICATIONS

This application is based on and claims priority from U.S. provisional patent application No. 60/138,814 dated Jun. 14, 1999.

This application is related to Ser. No. 08/532,561, filed Jun. 4, 1990, now U.S. Pat. No. 5,072,622; PCT/US 99/16612 filed Jul. 22, 1999; PCT/US 99/16968 filed Jul. 28, 1999; and PCT/US 99/17401 filed Jul. 29, 1999.

The foregoing and all other prior disclosures mentioned herein are incorporated by reference.

BACKGROUND OF THE INVENTION

Pipe and other tubulars, terms used interchangeably herein, have been lined with polymeric liners (e.g., polyethylene, nylon 11, etc.) for many years and several installation techniques are known to the art. These systems have been used principally in offshore and onshore pipelines, and in downhole production tubulars. Their scope has generally been limited to corrosion and erosion protection. However, they have also been used in monitoring for integrity of the composite liner-host system, as disclosed for example in U.S. Pat. No. 5,072,622 (Roach & Whitehead).

Generally, the liner 11 resides in close-tolerance with the host pipe 10 along its length, forming a stable composite system (as shown in FIG. 1, which is a cutaway end view of a lined tubular). The installed liner may be either of a loose-fit or a compressed-fit variety, both well known to the art. In all but very low pressure applications, the stresses induced by fluid pressure from within the liner are transmitted to the surrounding, 'host' tubular, and are resisted by the host tubular. The liner acts as an intermediary layer.

SUMMARY OF THE INVENTION

The invention described herein expands the range of possible applications for such liners through controlled manipulation of annular fluids within the lined tubular systems. The disclosed embodiments of the invention provide, among other features, a continuous annulus along the length of plastic-lined tubular, and if applicable, through any intermediary joints, and manipulation of fluids within the annulus.

The present invention may be applied to virtually all types of lined tubular systems, including but not limited to pipelines, intra-facility piping networks, and well tubulars.

A first aspect of the invention relates to structures and methods for forming a fluid-carrying annulus between the internal liner of a host tubular and the inner surface of a host tubular itself.

A second aspect of the invention provides methods and structures for improved fluid circulation within the annulus. Fluid circulation may be employed for measurement of fluid flow, for heat transfer within the pipeline, for treatment or removal of undesired or detrimental fluids, or for combinations of these features.

A third aspect of the invention provides methods and structures for reducing the propensity for propagation of cracks in a host tubular.

Other features and advantages of the invention will become apparent from the following description of embodiments of the invention which refers to the accompanying drawings.

BRIEF DESCRIPTION OF THE DRAWINGS

FIGS. 9a–9e are multiple cutaway side views of non-crushable members disposed between a liner and a host tubular.

FIGS. 16a, 16b, 16c and 16d are diagrams showing fluid constituent concentrations inside and outside the liner.

FIG. 18 is a diagram illustrating changes over time in the content of substances in the liner.

FIGS. 19a, 19b, 19c, and 19d are diagrams showing internal forces applied to a tubular.

FIGS. 20a, 20b, and 20c are perspective views illustrating the propagation of a crack in a tubular.

DETAILED DESCRIPTION OF EMBODIMENTS OF THE INVENTION

1. Formation of the Annulus

Three general liner types according to embodiments of the invention will be explained first.

Figure 1:
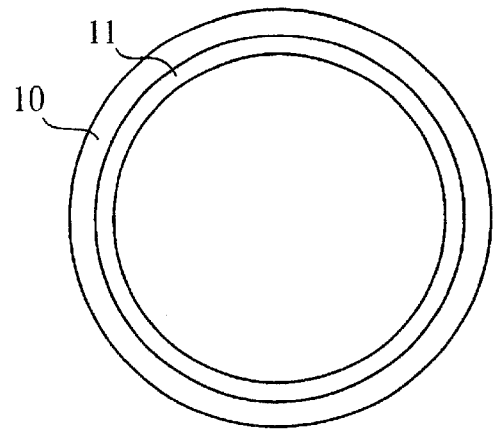
FIG. 1 is a cross-sectional view of a conventional lined tubular.
Figure 2A:
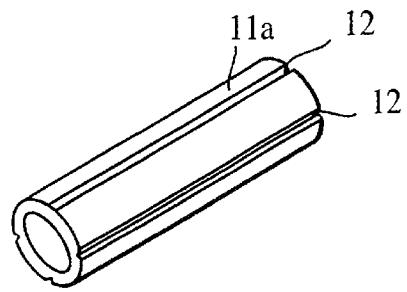
FIGS. 2a, 2b and 2c are respectively isometric illustrations of profiled liners.
Figure 2B:
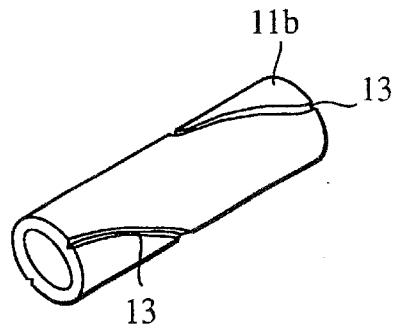
Figure 2C:
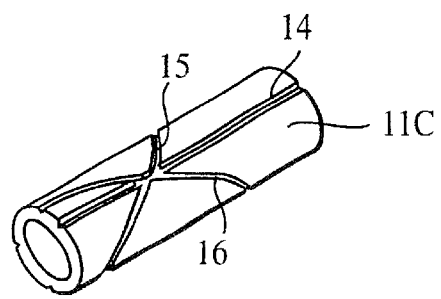
Figure 3C:
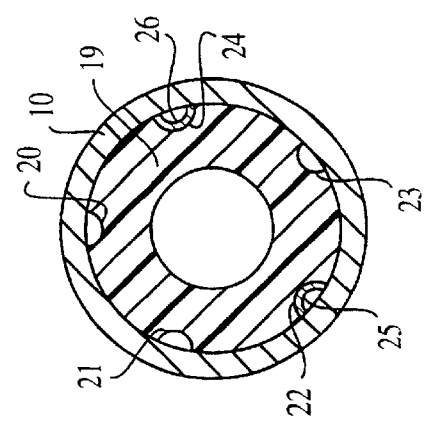
FIGS. 3a, 3b and 3c are respectively a side view and two cutaway end views of profiled liners in tubulars.
Figure 3B:
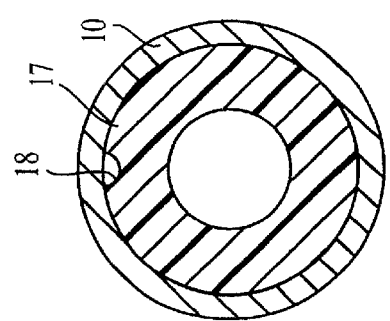
Figure 3A:
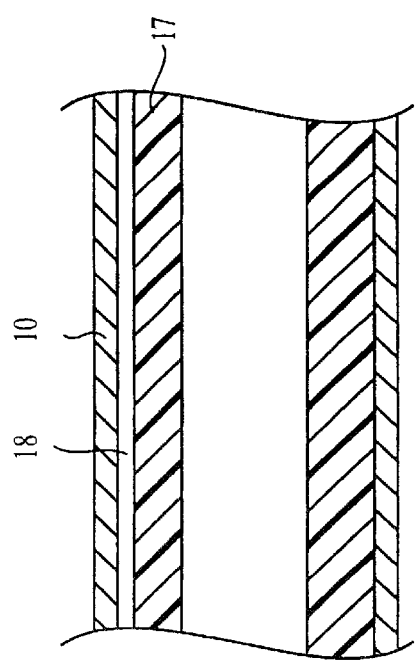

The first type of liner provides for profiling of the exterior wall of the liner such that one or more channels, shown in cross-section, are continued along the length of the lined tubular system (as shown in FIGS. 2a, 2b and 2c, which are respectively isometric illustrations of profiled liners, and in FIGS. 3a, 3b and 3c, which are respectively a side view and two end cutaway views of profiled liners in tubulars).

FIG. 2a shows a liner 11a with four straight longitudinal channels 12. FIG. 2b shows a liner 11b with two helical channels 13. FIG. 2c shows a liner 11c with one straight channel 14 and two helical channels 15 and 16.

FIG. 3a is a longitudinal cross-section and FIG. 3b is a transverse cross-section of a tubular 10 and a liner 17 with a single longitudinal channel 18. FIG. 3c shows a tubular 10 and a liner 19 with five channels 20–24.

In this first type of embodiment, one or more of the channels in the liner can be reinforced (the profiles 22 and 24 have reinforcements 25 and 26, respectively), or they may be left unsupported (see FIG. 3c). The reinforcement 25 is a portion of the liner 19 which is treated or modified to increase its strength and thereby reinforce the profile 22. Our possible modification is a reinforcing polymer coextruded along the portion of the liner. One possible treatment is fast quenching the portion of the liner to increase its crystallinity. Other strengthening treatments and modifications are also within the scope of the invention. On the other hand, the reinforcement 26 may be metallic or another strong material such as a ceramic or a polymer. Any strengthening material can be used.

Figure 6:
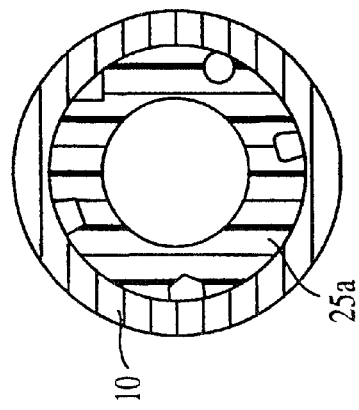
FIG. 6 is a cutaway end view of a lined tubular with multiple differently-shaped profiles formed in a liner.

The geometry of the defined channel may be varied according to individual preference and manufacturing capability. A plurality of different profile shapes may be used (as shown in FIG. 6, which is an end cutaway view of a lined tubular 10 with differently-shaped multiple profiles in a liner 25a). The profiling of the grooves may be varied freely without departing from the scope of the invention.

In the second type of liner, one or more non-crushable members are introduced between the liner's exterior and the host tubular's interior, such members providing continuity. See FIGS. 4a, 4b and 4c, which are respectively a side view and two end cutaway views of lined tubulars with members disposed therein.

In this second type of embodiment, one or more non-crushable members are located in the system annulus. The liner may either be profiled as described in the first embodiment, or it can be essentially smooth surfaced. The non-crushable members may be situated in the host tubular prior to the insertion of the liner, or they may be inserted concurrent with the liner. They may be affixed to the host tubular and/or the liner, but need not be adhered to either.

The members may comprise metal or any other durable material. Continuity along the channels within the host tubular may be provided by interstitial areas adjacent to the non-crushable members (which are disposed either within the channels, or between the host tubular and the outer surface of the liner, as the case may be).

Alternatively, continuity may be provided by making the non-crushable member of an effectively porous material, or by providing a non-crushable member which has lateral and longitudinal openings or perforations (such as a hollow member, a spring, or a cable with interstitial areas between the cable fiber strands) so as to permit fluid flow both into and along the non-crushable members. The member should be more permeable than the liner. Under operating conditions the member should not effect a seal which would prevent fluid permeating through the liner from reaching the annular pathway, or channel. Such a seal may occur, for example, when a solid semi-circular reinforcing member seated in a liner channel (see the '622 patent) is displaced radially outward into intimate contact with the host pipe as the liner bore pressure is increased. The edges of the member may intimately contact the host pipe, thus preventing permeating fluids from reaching the channel. In view of such considerations, therefore, a desirable alternative is to use a functionally porous reinforcing member. In the above examples, the porous member may be a multi strand cable or helical spring. Equally effectively, the desired porosity can be gained by using a member with an inherently porous material structure.

Figure 4C:
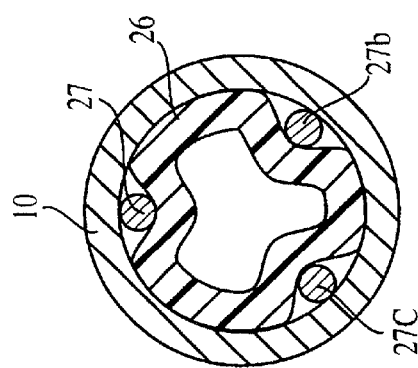
FIGS. 4a, 4b and 4c are respectively a side view and two cutaway end views of lined tubulars with non-crushable members disposed therein.
Figure 4B:
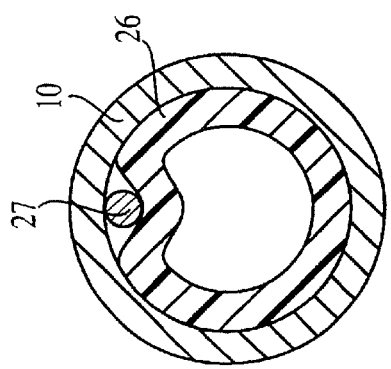
Figure 4A:
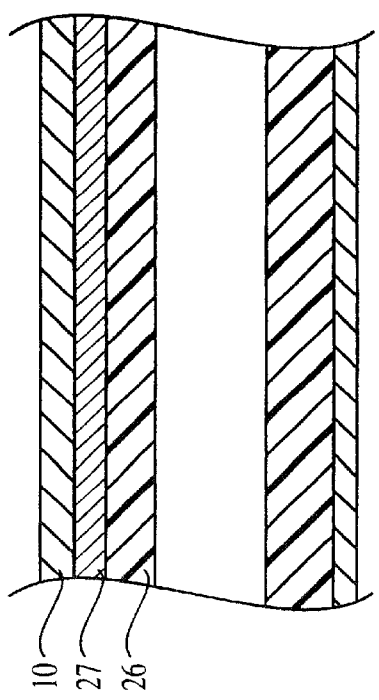

FIG. 4a is a longitudinal cross-section and FIG. 4b is a transverse cross-section of a tubular 10, a non-profiled liner 26, and a non-crushable member 27, shown as a cable in this example, disposed between the liner 26 and the tubular 10. As shown in FIG. 4c, two additional cables 27a and 27b are disposed between the liner 26 and the tubular 10.

Figure 8:
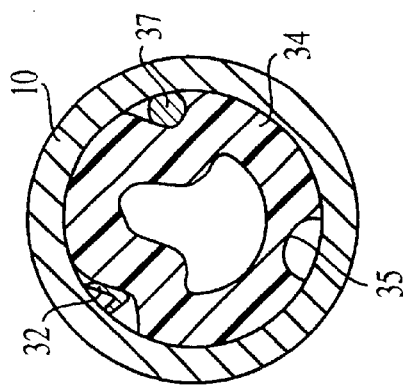
FIG. 8 is a cutaway end view of a lined tubular with non-crushable members disposed therein.
Figure 7:
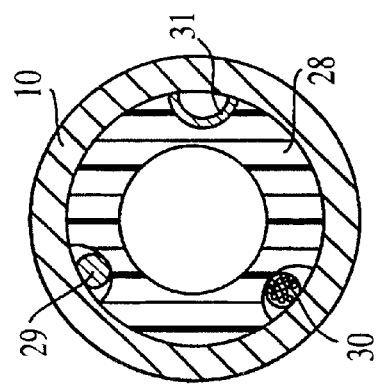
FIG. 7 is a cutaway end view of a lined tubular with non-crushable members disposed within profiles.

In the case of a profiled liner, a non-crushable member may be situated in one or more of the channels or depressions (see FIG. 7, which is an end cutaway view of a lined tubular 10, 28 with non-crushable members 29, 30, 31 disposed within profiles), or at the radial extremities (see FIG. 8). In FIG. 7, the member 29 is a bar, the member 30 is a cable, and the member 31 is a part-cylindrical reinforcement. In FIG. 8, a liner 34 has one channel 35 and two non-crushable members 32, 33 disposed not in the channel 35, but rather between the circumference of the liner 34 and the inner surface of the tubular 10. Non-crushable members may also take a mixed path across both regions. See FIG. 2c, which is an isometric view of a liner with mixed paths for profiles and/or non-crushable members. A non-crushable member if desired can be partially retained within a profile and can partially pass out of the profile into the space between the host tubular and the radial extremity of the liner. Or, a non-crushable member can change course and pass from one channel into another intersecting or non-intersecting channel.

The geometry of the non-crushable members may be varied according to individual preference. However, as a practical matter, the members' geometry should not induce a stress riser which is harmful to the liner or the host under expected operating conditions. Accordingly, it may be preferred that the contacting area of the member have a rounded shape.

In one such embodiment, a cable may serve as the non-crushable member, and in another, a helical spring. See FIG. 8, which is an end cutaway view of a lined tubular 10, 34 with non-crushable members 32, 33 disposed therein. FIGS. 9a–9e show multiple side cutaway views of non-crushable members between liner 26 and host tubular 10. In FIG. 9a, the member is a solid bar 36; in FIG. 9b a coated cable 37; in FIG. 9c a helical spring 38; in FIG. 9d an uncoated cable 39; and in FIG. 9e a barbed cable 40. The member, when situated in the composite liner-host system, will create at least one channel, dependent upon geometry, when the liner is installed.

The third type of liner involves the incorporation of rounded, granular particles, or irregularities on the outer surface of the liner, hereinafter referred to generally as "spacer members," in the annulus between liner and host. The spacer members are arranged in an orderly or a random fashion, as shown in FIGS. 5a, 5b and 5c, which are respectively a side view and two cutaway views of lined tubulars with spacer members disposed therein.

Figure 5C:
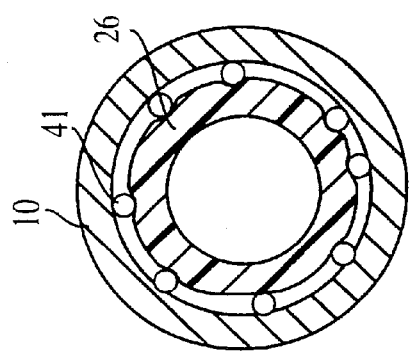
FIGS. 5a, 5b and 5c are respectively a side view and two cutaway end views of lined tubulars with spacer members disposed therein.
Figure 5B:
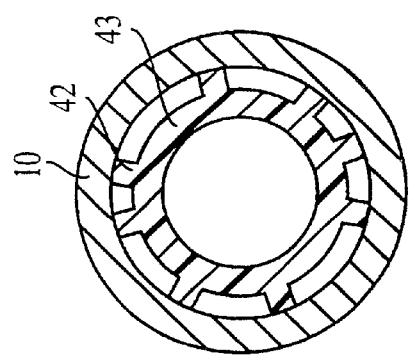
Figure 5A:
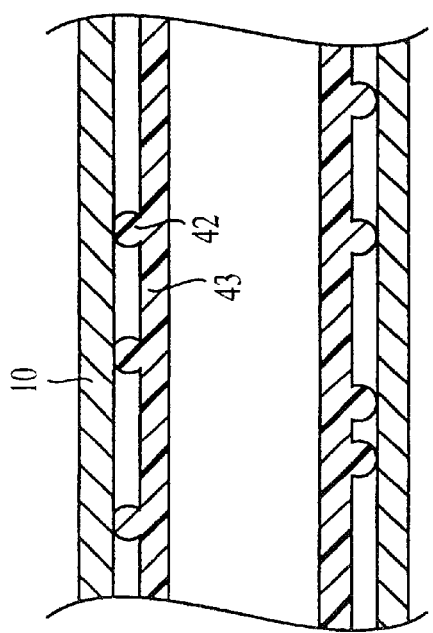

In this third type of embodiment, relatively small, rounded, non-crushable particles can be located within the annulus to create a pebbling effect (see FIG. 5c). Correctly positioned, these particles maintain annular continuity, thus permitting the flow of fluids therein. As in the previous case, the particles should not induce a harmful stress riser.

Effective embodiments may be provided by other methods as well. Irregularities 42 on the outer surface 43 of the plastic liner (see FIGS. 5a and 5b) may be fabricated in the liner's production process via controlled extrusion or adhesion. In another method, the irregularities may be introduced onto the plastic liner outer surface post-production, via adhesion or fusion. Alternatively, they may be integrated with the inside surface of the host tubular (not shown).

The spacer members need not be integral with either the plastic, liner or the host tubular to achieve the desired effect, however. Particles 41 may be located within the annulus (see FIG. 5c). For example, the particles may be introduced into the host tubular at the time of insertion of the plastic liner, with the dragging motion of the liner during the insertion process distributing them to their individual resting places. Alternatively, they may be pumped or blown in prior to and/or during the insertion process.

When situated, the spacer members create inconsistencies at the liner-tubular interface, effectively creating one or more pathways as in the previous two types of embodiments described; irregular in nature, but continuous nonetheless.

2. Improvements in Fluid Circulation

A central aspect of the invention relates to improving the circulation of fluids within the liner-pipe system annulus, for beneficial effect. For the purposes of this description, the first type of embodiment described above (FIGS. 1–3c), having external grooves in the liner, will be used for illustrative purposes. Notwithstanding, the invention can be applied equally to any of the mentioned embodiments, or derivatives thereof.

The circulation of annular fluid may be employed to provide at least three benefits; (a) to confirm the functioning of the monitoring and leak containment system ("MLCS"), as described by Roach & Whitehead, (b) to transfer heat along the pipeline, and (c) toward multiple utilities, to reduce or remove fluids detrimental to the material properties of the liner and/or host pipe.

a. Flow Measurement

Figure 10:
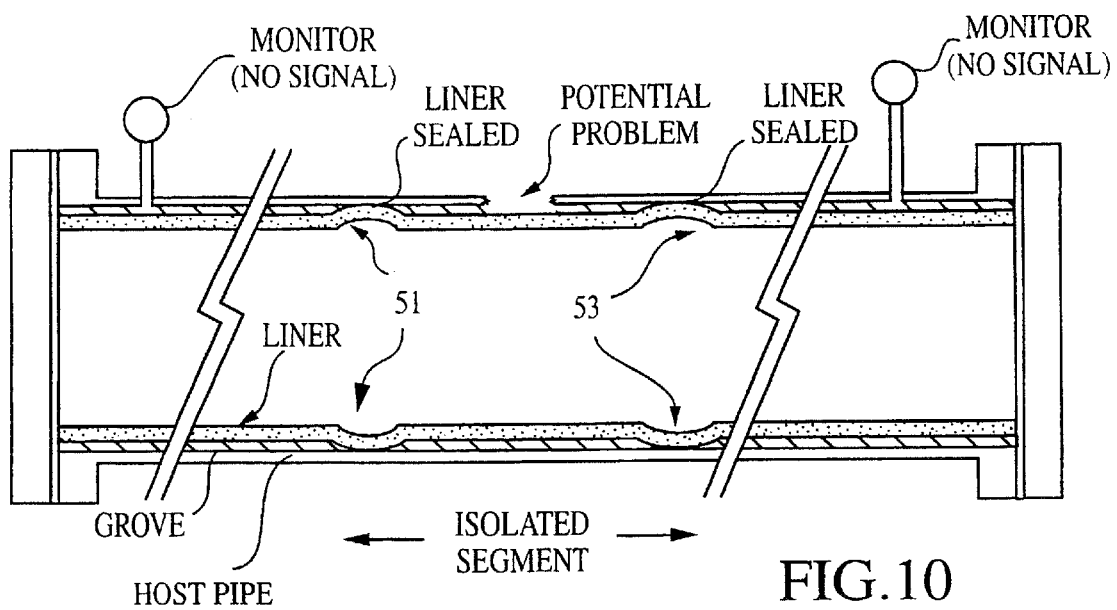
FIG. 10 is a cross-sectional view showing blockages between a liner and a host tubular.

In the first case, MLCS is effective only as long as the annular space remains open. If the grooves should close due to swelling (due to either thermal or chemical interactions), or internal bore pressure, they would be unable to carry the signal for which they are intended. For example, pressure differentials, which are used in the MLCS technique, could not be sensed along the entire length of a segment, the two sides of the blockage would be isolated from each other. As shown in FIG. 10, a blockage such as 51 or 53, or both, would render the grooves useless for their purpose. Moreover, under the MLCS system described by Roach & Whitehead, such a blockage could remain unknown to the operator indefinitely, making the system practically useless.

Figure 11:
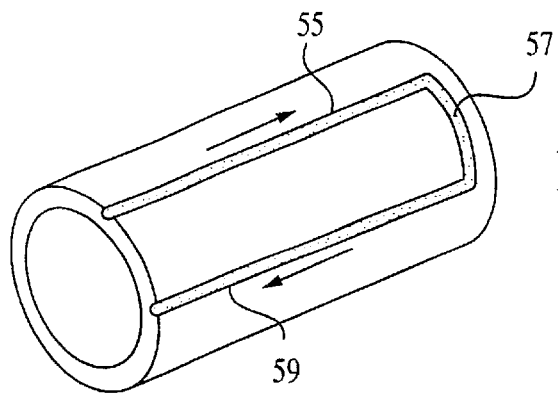
FIG. 11 is a perspective schematic view showing circulation of fluid in grooves formed in a liner.

However, as shown in FIG. 11, by arranging the grooves so that fluid is circulated in one direction along the pipeline through a first longitudinal portion 55 of the grooves, and subsequently returned in the reverse direction via a circumferential portion 57 and a remaining longitudinal portion 59, one is able to continually, or at intermittent times, demonstrate by observation and/or measurement that the grooves are open. This is schematically illustrated in FIG. 11, which shows a section of liner without host pipe. Conversely, by the lack of flow, one may also infer that MLCS is non-functional. Fluid circulating in grooves as shown in FIG. 11 would not impair the operation of MLCS. Moreover, a change in the quantity of fluid recovered with respect to the amount input would be indicative of a leak (either an increase or a decrease in the amount of fluid, depending on the pressure differential at the location of the leak).

Notwithstanding, acoustic, pressure or other signal types can also be transmitted through the fluid in the system of FIG. 11, permitting use of other monitoring systems known to the art.

Figure 12:
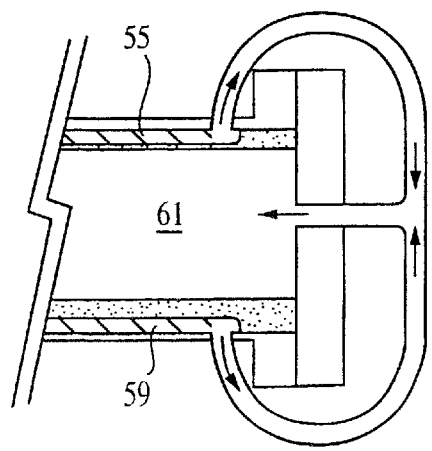
FIG. 12 is a cross-sectional view showing circulation of fluid from the annulus into the liner bore.

Alternatively, as shown schematically in FIG. 12, the fluid may be circulated in one direction only, through one or more of the grooves 55, 59. The fluid may then return via a non-annular conduit, e.g., the bore 61 of the pipe/liner composite system, being intermixed with contents therein, or via a separate utility line (not shown). Also, the fluid need not be returned, but rather may simply be disposed of at the distant end. Such disposal can constitute, for instance, release to the environment, or injection into a well located at the distant end. In this case, observation of fluid displacement indicates that the grooves are open. If annular fluids are returned, mass or volume measurements can also be used to confirm functionality, as in the case above. Again, such circulating fluid would not impair the operation of MLCS, as a true leak could be ascertained by a change in operational behavior; for example, an increase in fluid able to be transmitted at a specific pressure. Also as described above, signals can still be transmitted through the annulus.

In certain instances, circulation of fluid provides the only practical assurance that the annular pathways are functional. For example, in deepwater subsea hydrocarbon production pipelines, there is generally access to the pipeline at only one end, the produced fluid receiving end, since the well end is submerged. It is impractical therefore to attempt injection and monitoring of fluid at each end; rather it is preferred to do so at a facility located at the proximal end due to the complexities involved.

b. Thermal Transfer

In regard to the second benefit mentioned above, thermal transfer along the pipeline, fluids can be circulated in the same manner as described above regarding MLCS verification. However, in this case the fluid is circulated so that the latent heat of the annular fluid is transferred to the fluid in the bore, through the liner wall. The purpose is to maintain the bore fluid temperature at a level where desirable hydraulic and other properties are gained.

Figure 13A:
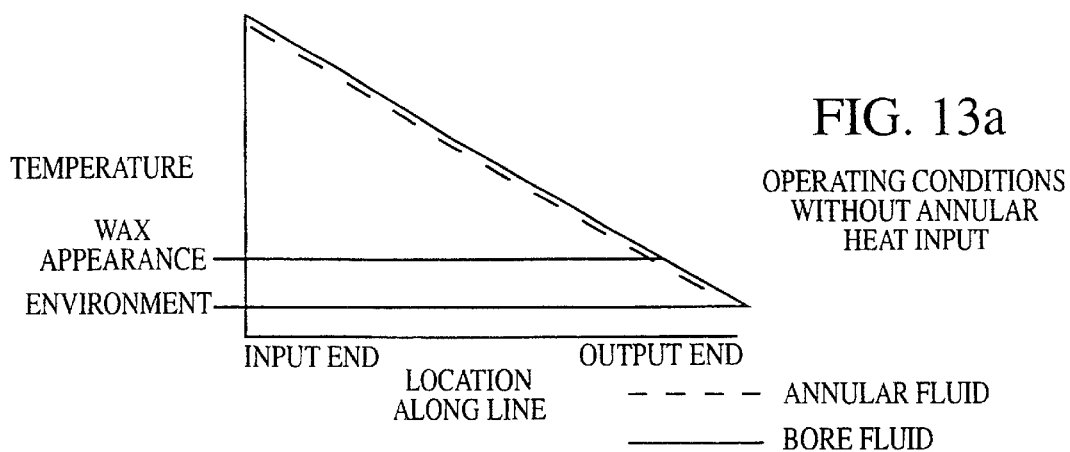
FIGS. 13a, 13b and 13c show temperature profiles of annular fluid and bore fluid along a pipeline.
Figure 13B:
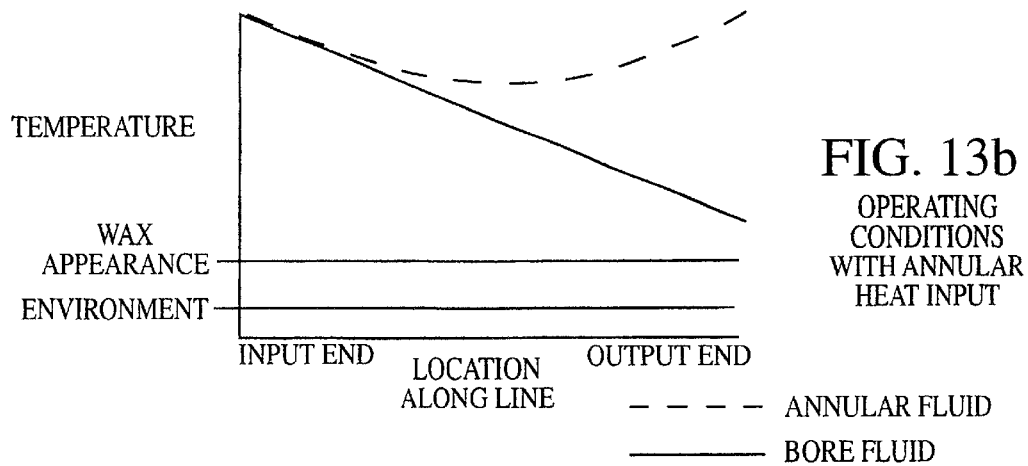
Figure 13C:
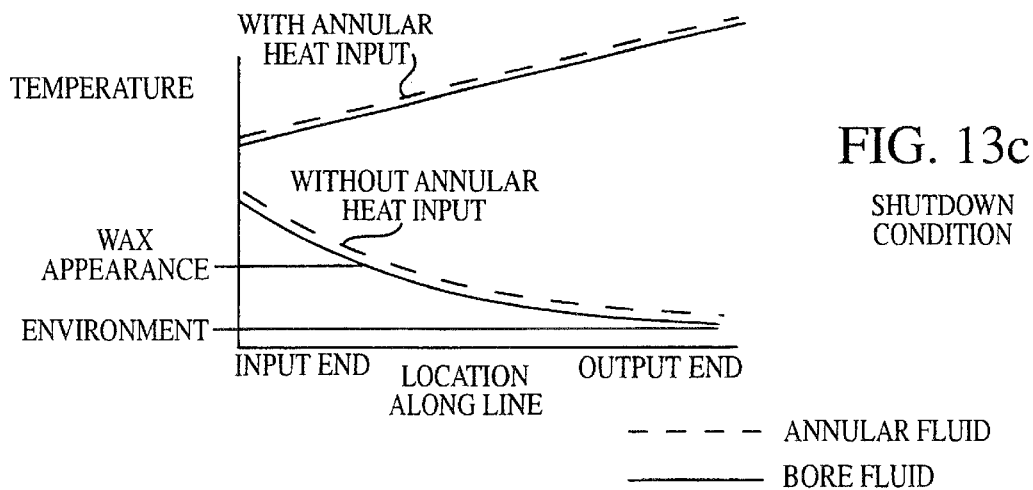
Figure 13D:
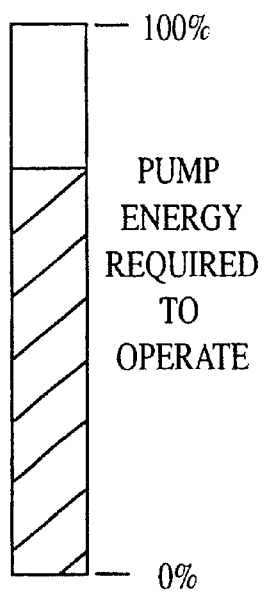
FIGS. 13d, 13e and 13f correspond to FIGS. 13a, 13b, and 13c respectively and show comparative pump energy requirements.
Figure 13E:
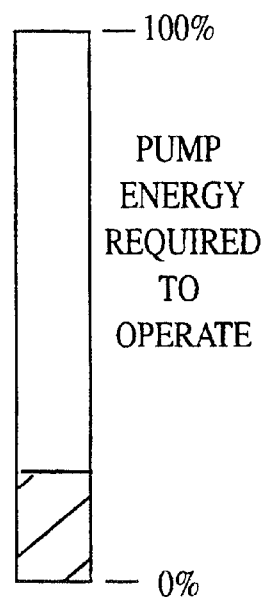
Figure 13F:
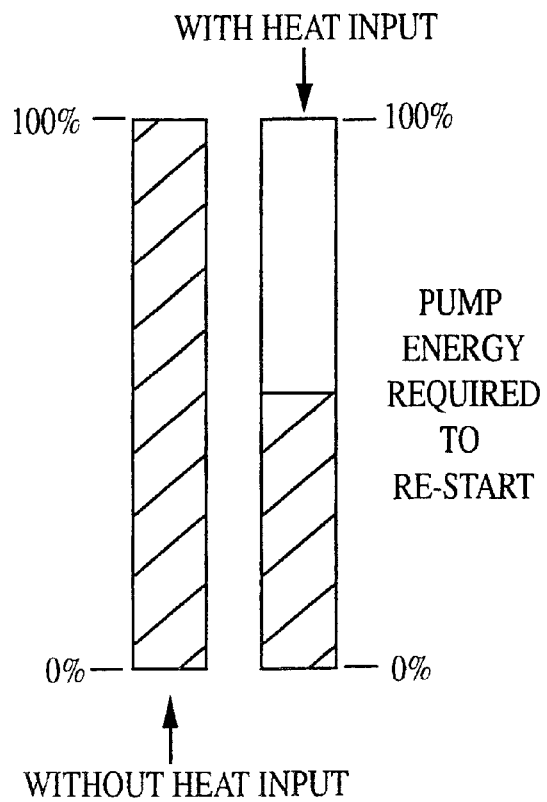

For example, temperature profiles are illustrated in FIGS. 13a, 13b and 13c, which show temperatures along a line from an input end to an output end. Annular fluid and bore fluid temperatures are shown respectively in dashed and solid lines. Comparative pump energy requirements are illustrated in FIGS. 13d, 13e and 13f, respectively. FIG. 13a shows the temperature profile without annular heat input. As shown in FIG. 13b, with heat input to the annulus, the temperature profile in the bore is less steep than that in FIG. 13a. This is particularly beneficial in the case where the bore fluid would attain a temperature at which its properties would substantially change, either in transit or if its flow were reduced or stopped, as shown in FIG. 13c. For example, at a certain temperature the fluid may become viscous, requiring excessive energy to pump. Alternatively, as in the case of raw produced hydrocarbons, petroleum waxes may form in suspension in the bore, increasing friction head, flocculating or adhering to the pipe wall, and ultimately causing the line to block. Likewise, by an analogous process, natural gas hydrates may form in some lines, also with the potential to choke off flow partly or entirely.

The annular fluid may be heated prior to circulation according to this feature of the invention, but not necessarily.

Typically, when the heating is performed, the annular fluid is heated to a level above that of the fluid in the bore, and/or the environment surrounding the pipe/liner composite structure. While the fluid is in transit, the temperature differential between the annular and bore fluids tends towards equalization through conduction; generally, the warmer annular fluid heating the bore fluid through the liner wall. However, the system also releases heat through the host pipe wall to the environment. The relative amount of heat transfer in each direction is governed by thermodynamic and insulation properties of the elements of the system. For example, insulating material applied externally to the liner and/or the host pipe wall will reduce the relative amount of heat transferred in that direction, essentially in favor of heat transfer in the interior direction, to the bore fluid.

In addition to the use of insulating material, the total quantity of heat transfer to the interior can be increased by use of an appropriate fluid. Such fluids have a relatively high heat carrying capacity and are known to the art under tradenames such as Dowtherm®. However, the fluid need not necessarily be selected for, and dedicated to, its heat transfer properties. Instead, it may serve multiple roles. As examples; the fluid may constitute in whole or part bactericides and/or general inhibitors to mitigate corrosion of a host metallic pipe. Or, the annular fluid may contain wax or hydrate inhibitors, such as methanol, which after traveling to the remote end, may be returned via the primary fluid in the pipe bore as illustrated schematically in FIG. 12.

The use of the annulus of the liner/pipe composite system has benefit in various applications, which are used herein for illustration purposes, particularly in the production of hydrocarbons, and especially offshore pipelines; but it is not limited to such applications.

Fluids produced from a subsea well are transported to a vessel or structure via a pipeline and riser system. Commonly, the produced fluids may contain '3 phases', i.e., hydrocarbons, water and gas simultaneously. Further, these bore fluids are generally at a higher temperature than the environment and thus lose heat in transit. A temperature drop can create operational problems. Waxes can solidify from the hydrocarbons, and/or gas hydrates can form from the gas-water portion. Either can lead to blockage of the conduit, rendering it non-functional.

Accordingly, many attempts have been made to prevent excessive heat loss of fluid in transit or during an operational shutdown. Increasing insulation thickness is beneficial in reducing rate of loss. However, increasing pipeline depth also increases hydrostatic head requiring special material and construction considerations. However, such enhancements are cost prohibitive.

A proposed alternative to heating the fluid or increasing the insulation is induction heating of the host pipe. However, this is in an early, experimental stage and may never become available in a commercially viable, non-complex, functional form.

Figure 14:
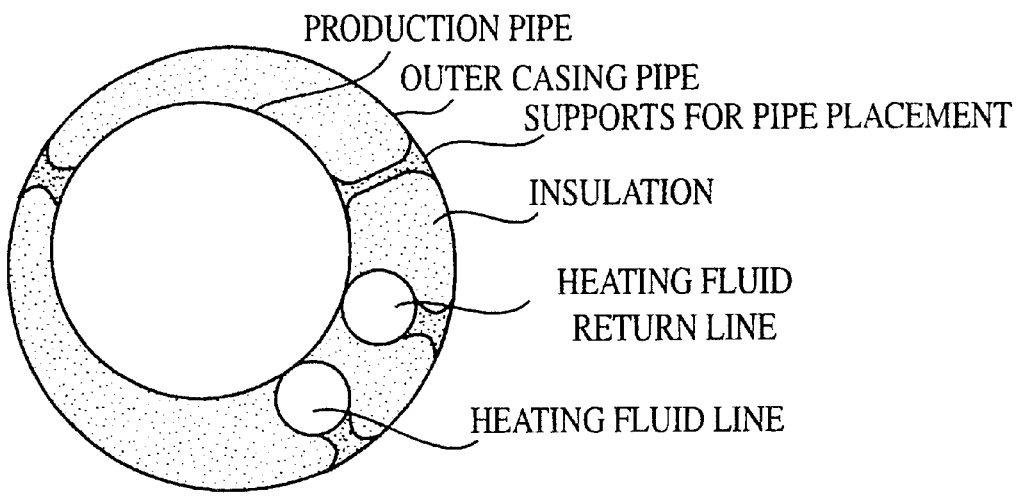
FIG. 14 is a cross-sectional view of a known example of bundled pipe.

In another known method, using bundled pipe, several pipes are bundled together in groups and held in position by supports and/or insulation within a larger carrier pipe, illustrated in FIG. 14. In bundles, one or more of the internal lines may be used for heat transfer along the main pipeline. However, these systems are complex, cost prohibitive, and generally not very effective for transfer of heat from one pipe to another.

The present invention, in comparison, provides a novel, cost-effective, and relatively simple method of transferring heat along the pipeline. As compared to existing methods mentioned above, the need for costly insulation is minimized, electricity is not required for heating, and construction and operation complexities are greatly reduced.

Figure 15:
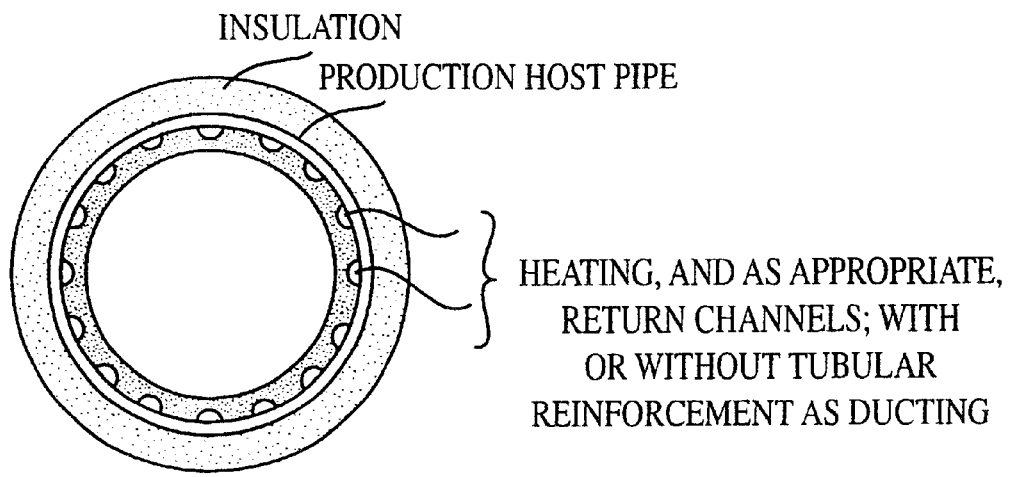
FIG. 15 is a cross-sectional view showing a liner with channels formed around the circumference of the bore for heating the bore fluid.

In comparison to bundled systems, the present invention is superior by virtue of its design simplicity and the low cost of its materials. In a typical bundled arrangement a single heater pipe is placed adjacent to the primary fluid carrier pipe, transferring heat relatively ineffectively, i.e., essentially onto one small arc of the pipe's circumference. In comparison, the present invention allows for application of heat relatively evenly around the entire circumference of the bore fluid via multiple annular channels, as shown in FIG. 15. Further, the invention allows a number of simple joining and construction techniques known to the art to be employed, i.e., S-lay, J-lay, reel-lay, and controlled tow. By comparison, conventionally, bundles are deployed exclusively by the most costly and complex technique, i.e., controlled tow. Moreover, the versatility of the present invention in regard to installation techniques is a true advantage when marine equipment availability is considered, as this is recognized by the marine construction industry at large to be a substantially limiting factor.

In various applications of the present invention, the amount of heat required from the annular fluid to prevent wax and/or hydrate formation in a production flowline may range from negligible to significant, depending upon the matrix of parameters.

A significant advantage of the invention is the ability to minimize insulation, i.e., capital expense, and instead maximize annular fluid heat transfer via annular fluid, i.e., operating expense. For example, pipe insulation thickness may be reduced from 3" to ½", resulting in an insulation materials cost reduction of approximately 75%. Handling and installation complexities are also reduced with less insulation, making for even greater overall cost reduction benefits.

Accordingly, the annular fluid may be heated at one end and circulated. The input heat required for raising the temperature of the annular fluid may be provided by an independent heating unit (e.g., a boiler), by a heat exchanger which draws heat from the primary fluid after it is no longer required (e.g., on a production platform after water/gas/oil separation), or by a combination thereof.

Towards the other design extreme, designers may prefer to use ample insulation to prevent significant temperature deterioration in-transit, and thus use the annular fluid as a backup or redundant system. In this case the latent heat of the primary fluid stream, in combination with the insulation, is sufficient to deter wax and/or hydrate formation while in transit. At line shutdown, however, heat loss from a virtually static system may allow the bore fluid to thermally degrade to a problematic level, at which for example wax formation would occur. In such a situation, more heat may be required. At this juncture, the annular fluid circulation aspect of the present invention is used beneficially, to slow or halt the bore fluid's thermal decline, as shown and described above in connection with FIGS. 13a–13c. Accordingly, in this example, annular circulation is minimal under normal operations, but upon shutdown, heated fluid is circulated at a much greater rate in order to keep the bore fluid temperature from declining undesirably.

The application of the present invention, although illustrated by the two above examples, is applicable across the breadth of heat transfer requirements as preferred for a particular purpose by an individual designer or operator.

Neither is the invention limited to pipelines. Rather, for example, it may be employed downhole in well production tubulars, where natural gas hydrate formation may be problematic. Further, the invention may be utilized in any situation requiring heat transfer, requiring only modifications to tubular orientation, and adaptation to fittings geometry as preferred in the particular industry of application.

c. Treatment or Removal of Fluids

Another beneficial aspect of the present invention, the manipulation of fluids in the annulus, is that it facilitates treatment or removal of annular fluids which themselves may be detrimental to the physical and mechanical properties of the liner and/or host pipe. Such harmful fluids may make themselves present in the annulus via a leak in the liner or host pipe, or most often, by permeation through the thermoplastic liner.

In the case of a leak, it is possible to circulate a benign fluid as shown for example in FIG. 11, through the annulus in order to dilute any harmful fluid which may find its way to the area. The fluid can be diluted to a concentration that is innocuous to the liner and/or host pipe materials, by varying the volumetric flow of the benign annular fluid added to the system. Alternatively a fluid can be supplied to the annulus that is of a nature which, upon reaction with the aggressive fluid present, reduces it to a benign state, e.g., by chemical buffering of permeated fluids having acidic properties.

As an illustration, consider the case where the fluid transported within the bore of the pipeline is acidic in nature, and it escapes through a liner breach and chemically attacks the metallic host pipe, but not the plastic liner. The rate of the chemical reaction on the host pipe, associated with the degrading of its mechanical properties and therefore its service utility, can be related to fluid pH, and therefore concentration of the acid in solution.

In one embodiment of the invention, water can be injected into the annulus at one end of the pipeline. When it reaches the point where the liner is breached and acidic fluid enters the annulus, the injected water dilutes the fluid, decreasing the acid concentration, effectively raising its pH level.

In another embodiment, an alkali, e.g., sodium hydroxide, in solution, or a chemical buffering fluid, can be injected into the annulus. When such fluid reaches the location where the acidic bore fluid enters the annulus via the liner breach, a chemical reaction between the two will occur. This will result in a less aggressive solution present in the annulus, with a higher pH.

In either of the above cases, dilution or reaction, the rate of attack on the host pipe by the resulting fluid mixture will be reduced as compared to that of solely the original acidic fluid; a desirable condition.

In the case of permeation through the liner, the invention may be used both for mitigation of potential problems associated with thermoplastic liners, and, for generally improving the system performance. Although polyethylene and nylon materials are used for illustration purposes, the invention is also effective for many other select plastic materials.

Virtually all types of plastic liners used in pipelines allow some degree of permeation of the fluids which are conveyed. The process by which this occurs is that of molecular diffusion. Further, each constituent compound of the permeating fluid mixture will have a unique permeation rate for the liner material employed. The permeation rate of each constituent of a fluid relative to the liner material used is established by a matrix of conditions, i.e., temperature, pressure, relative molecular size, etc. However, the theoretical scope of relative differentiation is not essential to the description of the present invention. Proper selection of plastic liner material can minimize permeation rate of said fluid constituents, but realistically the process can never be completely halted.

Regarding the permeation of said fluids, a benefit provided by the invention, as compared to generic liner systems, is mitigating the corrosion potential of a host metallic pipe.

In the general case for liner systems, annular fluid quantities build up as the fluids from the liner bore diffuse through the liner to occupy the liner-pipe annulus. Ultimately, the level and nature of annular fluids reach equilibrium pressure and constituency, consistent with the established physical law related to partial pressure. Certain fluid constituents may permeate more rapidly than others. For example, the permeation rate for hydrogen sulfide through polyethylene is approximately two orders of magnitude (i.e., greater than 100 times) greater than that of water. As a consequence, such rapidly permeating fluids attain their respective equilibrium partial pressures earlier than others in a lined pipe system where annular fluids are not manipulated according to the present invention.

Accordingly, in a system which does not employ the invention, e.g. a generic liner system, a static equilibrium state is reached when the annular concentration of each constituent fluid is equal to that on the opposing side of the membrane, i.e., the pressurized pipe bore. This is illustrated in the charts of FIGS. 16a, 16b and 16c.

Often the bore fluid is detrimental to a metallic host pipe. For example, it may contain significant sulfuric acid due to presence of water and hydrogen sulfide. The resultant annular fluid owing to permeation of bore fluids will have a similarly detrimental effect on the host pipe wall, particularly when the annular pressure equalizes to that of the bore pressure, as it will in a lined pipe system where the present invention is not employed, and equilibrium conditions are reached.

By manipulating annular fluids according to the present invention, detrimental annular fluid conditions are avoided. The partial pressure equilibrium of the bore fluid and the annular fluid is never attained. This desirable state can be effected by one of two methods.

First, the annular fluids can be evacuated, at a pressure less than that which allows the effective chemical recombination of constituent permeated bore fluids to form more aggressive fluids. Negative pressure can be applied by any known means, e.g., a vacuum pump, a relief valve, or a vent,.according to known techniques.

Take for example a case where water and hydrogen sulfide are present in the bore of a lined pipe. Water permeates through the liner in gaseous phase, as does hydrogen sulfide. By manipulation of annular pressure, water is prevented from condensing, and then its potential for reaction with hydrogen sulfide to form sulfuric acid is negligible. By employing the invention, therefore, annular fluids achieve a dynamic equilibrium with respect to the concentration of their constituents, rather than a static equilibrium which is created through balancing of partial pressures as discussed above.

Such a dynamic equilibrium is governed instead by the permeating constituents' unique diffusion/permeation rates. At one limit, for example, when annular fluids are removed at a rate equal to the total permeation, the equilibrium concentration of the permeating fluids will be that of their relative permeation rates through the liner. By comparison, in the static case referred to earlier, where the invention is not employed, concentration equilibrium is attained when fluid partial pressures equalize on both sides of the liner membrane, i.e., independent of Using the fluids mentioned, hydrogen sulfide and water, an illustration can be made using a practical set of conditions. Assume that within the bore of the lined pipe system the partial pressure of hydrogen sulfide is 5 bar and water is 20 bar, and approximately proportional to their respective volumes in gaseous phase. Further, assume that the liquid phase within the bore comprises only these two constituents and their chemical byproducts, i.e., water, hydrogen sulfide, and sulfuric acid. At such conditions it is possible to have a 5% solution of sulfuric acid, a concentration which readily attacks metals. Using the invention, however, annular fluids can be manipulated in evacuating the region to maintain a lowered pressure, for example 1 bar. As indicated above, hydrogen sulfide permeates through polyethylene liner much more readily than does water, approximately 100 times as fast. Accordingly, in spite of the higher partial pressure of the water driving the permeation process, much more hydrogen sulfide actually reaches the annulus; approximately 25 times as much. This can be estimated by the ratio of their respective partial pressures multiplied by the respective rates of permeation [5 bar×100]/[20 bar×1]= 25). Therefore, by manipulating the annular fluid so that only 1 bar total annular pressure is maintained, the partial pressures of hydrogen sulfide and water will be approximately 0.96 bar and 0.04 bar respectively. At this total pressure, the sulfuric acid formation rate is negligible. The resultant concentration of sulfuric acid in such a case, therefore, might be 1%, that is, significantly less concentrated than within the bore, and therefore much less aggressive to the host pipe. This permeation-reaction relationship, also, combined with the barrier effect of the liner, whereby the gross amount of fluid reaching the annulus is minimized, indicates that the host pipe's net corrosion rate becomes virtually non-existent.

In comparison, this contrasts greatly with the case of a generic liner, and static equilibrium, where the higher concentration of sulfuric acid would once again be present in the annulus, providing a much greater corrosion potential for the host pipe. Thus the beneficial effect provided by the invention, that of manipulating annular fluid, is demonstrated.

In a second case regarding permeation of potentially aggressive fluids, annular fluid can be manipulated in such a manner such that undesirable, aggressive fluids are displaced or diluted by others. As discussed above, the resultant annular fluid is more benign with regard to chemical attack on the host pipe. The fluids suitable for use in this case either prevent formation of said aggressive fluids, or, convey them at concentrations insufficiently aggressive to cause harm to the host pipe.

Once again, to continue the illustration, the conditions of the previous illustration, using hydrogen sulfide and water as constituents, can be used. For example, by extension of the previous case, if the 1% sulfuric acid solution in the annulus is deemed unsuitable for extended contact with the host pipe, even in the minute volumes evolved due to the permeation process, the invention provides for improvements towards more benign annular fluid concentrations. In this case, annular fluids, such as de-natured water, or, a weak sodium hydroxide solution can be injected or added at a rate sufficient to reduce the level of acidity to the level of maximum tolerance, perhaps 0.1% solution.

In quantifying the extent of action required, one estimates the unit rate of sulfuric acid produced due to permeation of the constituents at operating conditions. In the next step, an offsetting measured amount of reciprocal fluid required to affect the desired change is inserted into the annulus. The resulting annular fluid is then sufficiently benign, validating the utility of the invention.

In the examples above, as shown in FIG. 16d, the constituency of the annular fluid owing to permeation will approximate that of their relative permeation rates, not the partial pressures of each on the driving side. A dynamic, not static, equilibrium results.

Referring to the examples, employing the invention prevents sulfuric acid from collecting in the annulus at a detrimental concentration. Annular fluid is continuously withdrawn from the system, preventing pressure equalization between the liner bore and the annular grooves. Equilibrium governed by partial pressure is thus never attained. Instead, the ratio of hydrogen sulfide to water present in the annulus is determined by comparative permeation rates at the conditions involved. Thus, according to the invention, the potential for attack of the metallic host tubular is substantially mitigated. Indeed, the principles of controlling annular fluid flow to minimize potential corrosion reactions can be equally applied to other reactions as well, e.g., carbon dioxide and water, oxygen and water, etc.

d. Evaporation and Dissolution of Fluids

In illustrating another beneficial aspect of the present invention, permeated fluids finding their way to the liner-annulus interface may be encouraged to either evaporate, or to dissolve in an annular fluid intentionally selected for the purpose.

Evaporation of permeated fluids may be gained via the invention by reducing relative pressure in the annulus. This creates a condition of high evaporative potential drawing volatile fluids away from and out of the liner material matrix at its surface, specifically at the groove annular interface.

Similarly, dissolution of permeated fluids may be gained by using an annular fluid that has greater affinity for the permeating fluid than does the liner material. As previously noted, permeating fluid, being more attracted to the annular fluid, is withdrawn from the liner material matrix at its surface, at the groove annular interface.

In either case above, the liner material at the surface of the groove becomes less saturated with permeated fluid than at any location in the liner wall, as measured radially between the external and internal surfaces. Effectively, a saturation gradient is formed. Inner layers are fully saturated, while the outer layer, at the groove-annular interface, has a much reduced degree of saturation, illustrated in FIGS. 17a and 17b.

A hydrocarbon transport situation may be used in illustrating the practicality of the present invention with reference to polyethylene liners. It is known that saturation with hydrocarbons substantially reduces polythylene's physical mechanical properties due to plasticization. Further, it is known that the effect is essentially reversible, the material regaining its properties when the hydrocarbons are subsequently removed. Notwithstanding, plasticized material at the liner groove is an undesirable condition, as it provides for less resistance to deformation under stress. The likelihood of groove collapse under load is thus increased, which if it happens, negates the operational benefits provided by the system, as well as the ability to effect the invention.

Figure 17C:
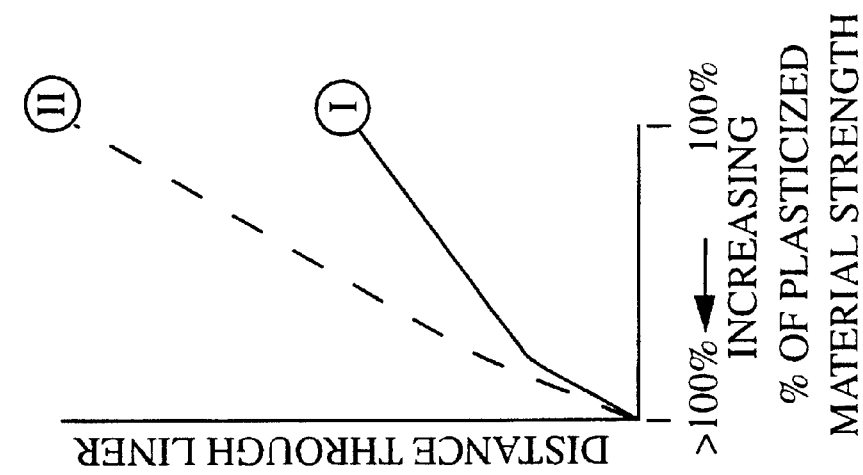
FIGS. 17a, 17b, and 17c are diagrams showing saturation of the liner with permeated fluid.
Figure 17B:
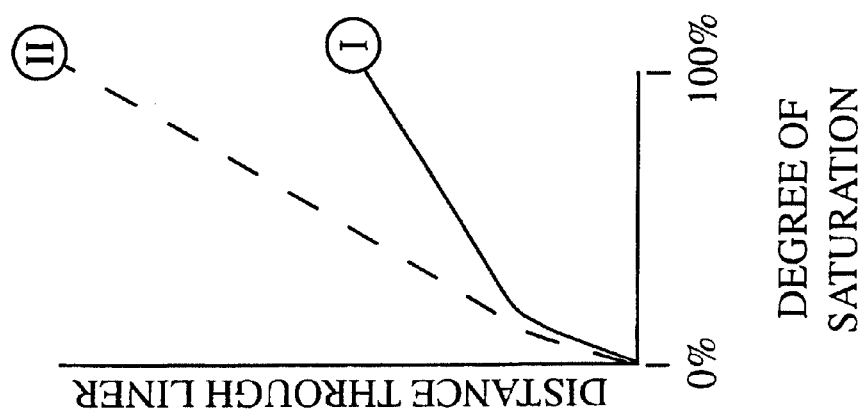
Figure 17A:
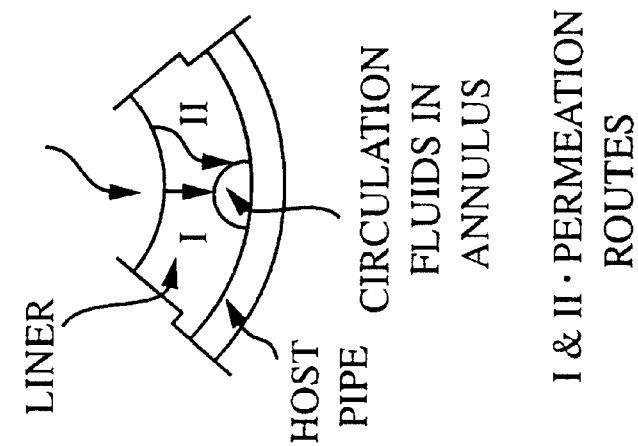

However, when the material layer of the groove surface has its degree of saturation reduced by the invention, i.e., evaporation or dissolution of fluids via annular fluid manipulation, benefits are gained locally. As stated above, plasticization is avoided, the material's elastic modulus recovers, greater mechanical strength is available, and therefore greater resistance to deformation is gained, as seen in FIG. 17c. Accordingly, reducing saturation in this groove surface layer by manipulation of annular fluids aids the effectiveness and suitability of the invention. A broader operations envelope results for the system, as the ability for groove passages to remain open through higher pressure and/or temperature conditions is enhanced, allowing the invention to be employed with greater efficiency.

In comparison, if annular fluids are not manipulated in accord with the invention, no saturation gradient will be evident through the wall of the liner. Therefore, the liner material layer at and interior to the groove will suffer deterioration of mechanical properties equal to that found through the entire liner wall. Consequently, the material defining the grooves is fully plasticized and the grooves' ability to withstand deformation under load will, undesirably, be much reduced.

In a related fashion, beneficial conditioning for nylon materials in liner service may be hastened. Typically nylon liners are manufactured containing plasticizers to facilitate handling and installation. However, once the liner is positioned in the host pipe, such plasticizers offer little benefit; it being generally desirable to maximize the mechanical stiffness of the liner material in place. As described previously, enhancing this material stiffness at the groove-annular interface improves the resistance of the groove to collapse under stress.

In this case, the invention promotes leaching of plasticizer from the liner wall to increase overall liner material stiffness. Normally for liner systems, such leaching occurs via the inner wall, i.e., the bore side, only, as it is the only route for the process. In the present invention, however, as fluids permeate through the liner wall towards the grooves, plasticizer will be leached via the annulus as well. Circulation of suitable annular fluids hastens the leachate removal process and accordingly the liner's mechanical properties for resisting stress deformation improve more rapidly. In this way, the invention is highly contributory to the gaining of the material benefit, as plasticizer leaching is facilitated via both the inner liner wall, and especially via the grooves in the outer liner wall. This is, of course, in comparison to the case without the invention, where a much reduced rate is available, retarding or even prohibiting liner performance optimization. The concept is illustrated in the charts of FIG. 18.

In a related fashion, the invention is also beneficial for cross-linking of Silane®-type polyethylene liners. In the case of this material, a reaction with water is required to obtain the desired cross-linked properties. Generally this is effected after the thermoplastic liner has been inserted in the host pipe. The rate of the cross-linking reaction is correlated positively to temperature, pressure and surface contact area. Thus, cross-linking may be accelerated via the present invention in multiple fashions, as seen in FIG. 18. First, circulation of warm fluid of any type through the annular grooves accelerates the reaction rate where water is provided via the main bore of the liner-pipe system. Further, even greater reaction acceleration is afforded where water is a constituent of the annular fluid. Thus the utility of the invention, i.e., controlled manipulation of fluid nature, pressure and temperature, is clear in this case.

e. Crack Prevention

Another utility provided by the present invention is in arresting rapid crack propagation in a metallic host pipe in the event of a rupture. This utility is particularly valuable for gas transmission pipelines where currently, without the invention, brittle-type fractures in the host pipe can spontaneously propagate extensively and rapidly. Such incidents often result in explosions, damaging property and causing loss of life. The invention is equally effective for multiphase lines, e.g., hydrocarbon production flowlines conveying both gas and liquid phases, where extensive crack propagation can also occur, and which inevitably results in large spills and often explosions. In such events, clearly the consequences are highly undesirable.

According to the invention, the forces owing to internal pressurization of the bore are transferred virtually in their entirety through the relatively elastic liner to the relatively rigid steel pipe, with the latter acting as a structural member, per FIG. 19*a*. However, in this case, the load is translated to the pipe in a unique way, as compared to other lined pipe arrangements.

The liner, as employed in the present invention, is therefore essentially an intermediate layer with relatively little structural strength, transferring compressive loading from the bore fluid to the host pipe. The effective loading that the host pipe experiences, however, is substantially different when the present invention is employed, than it is in the case when the host pipe is in direct contact with the bore fluid, and no liner is present. Specifically, the bore fluid, when directly applied to the host pipe, will apply hydrostatic pressure to the entirety of the host pipe inner surface.

In illustration of the invention, annular fluid quantity is reduced when bore pressure is increased. This can be done by external means, e.g., evacuation pumps, valves, etc. Or, it may be done by virtue of the radial displacement of the liner under load, reducing the annular volume, and the annular fluid simultaneously. In this case, annular fluid reduction is commensurate with the outward radial displacement of the liner wall at the surface of the grooves. The volumetric reduction of annular fluid also provides for relief of potential pressure build-up in the annulus due to permeation of fluids from the bore. The pressure of the annular fluid is maintained at a level which is different, but in general, substantially less, than that of the bore fluid. In any event, the annular fluid, liquid, gas or multi-phase, is displaced according to the invention.

In the cases of gas and multi-phase fluids just mentioned, according to the invention, the annular fluid is manipulated so that compression of the annular fluid within the geometry of the groove is relatively little. The net effect of this annular fluid manipulation is that the force experienced by the host pipe which is owing to the bore fluid pressure must be translated to the host pipe via direct contact with the grooved liner exclusively. The force is passed along only at the outermost portions of the channeled liner, which at the outset of this document was chosen to be one of the illustrative embodiments, not at the grooves. This is so since neither the base of the grooves is in contact with the host pipe, nor is the low pressure annular fluid, as manipulated according to the invention, capable of transmitting the load (see FIG. 19*a*).

Thus in the gas and multi-phase annular fluid case for the grooved liner system described, the host pipe does not experience uniform pressure loading as would be provided by direct contact with such fluids. Instead, the host pipe experiences multiple point loading where the liner is in contact with it, at the outermost portions only, rather than hydrostatic loading as in a general case. Thus, the host pipe acts as the exclusive structural member of the composite system, resisting hoop and other stresses as translated via the liner, but it does not experience fluid pressure directly.

This stress configuration for grooved liners is differentiated from generic, smooth-wall liner systems, where the annular fluids are unable to be manipulated according to the present invention.

In the case of a generic, smooth-walled liner where there is only a small volume of annular fluids which tend to be comprised significantly of gases residing at a pressure equilibrium with those fluids in the pipe bore, the invention is not able to be employed to beneficial effect. As a function of geometry, the liner and the compressed annular fluid are both equally capable of applying pressure to the inner host pipe wall, at equal magnitude. In this generic case, therefore, it can be shown that the host pipe experiences a uniform pressure loading situation, as seen in FIGS. 19c and 19d. The load is contributed by both the liner and the annular fluid in contact with the host pipe, said fluid constituting free gas and/or a significant portion of gas in solution. Such a stress configuration does not employ the invention. Indeed, the stress configuration negates the beneficial effect of the invention. A rupture in the host pipe caused by excessive pressure will be self-limiting at the outset. The host pipe may crack, but the crack may not run, because the applied pressure may still be low. However, as explained below, the rupture in the host pipe can resume at a later time under the existing pressure load. For example, the liner may fail and thereby permit high pressure from the liner bore to be applied to the pipe. Although the initial rupture is curtailed, the fluid pressure in the bore will ultimately cause the liner to fail. At this time, gases from the bore will be freed, effecting extensive crack propagation and the undesirable effects described above.

In the case of a liquid annular fluid, however, annular pressure can be maintained at equilibrium with the bore pressure, provided that the liquid is a virtually non-compressible fluid with relatively little dissolved gas. A uniform stress configuration on the host pipe in the liquid annular fluid case, unlike the gaseous or multiphase case, will not inhibit the utility or benefit provided by the present invention.

Understanding the nature of crack propagation in the host pipe is helpful in describing the invention methodology. Upon overpressurization, a metallic pipe will generally rupture from excessive hoop stress experienced, per FIG. 20a. The manifestation of the rupture is that the pipe wall cleaves, generally along the longitudinal axis; this being perpendicular to the hoop stress induced by the outwardly radial force created by the internal pressure.

Independent of the phase of the fluid contributing to the stress (gas, liquid or multiple), this type of failure geometry generally holds true for the initial phase of the formation of the failure in the host tubular. Subsequent manifestations regarding the process of the failure event, however, are dependent upon the fluid phase to a major extent. Liquid phase contents will not generally facilitate propagation of the crack along the longitudinal axis, and the crack will stop over a short distance (see FIG. 20b). Gaseous or multi-phase fluids under pressure can, however, and often do facilitate crack propagation with extensive crack lengths forming before a halt is seen (see FIG. 20c).

With all fluid types, the rupture event establishes a decompression wavefront moving in all directions from the event's initiation location. The velocity of the wavefront, which is related to the fluid through which the wavefront must travel, is key to the present invention.

With a liquid medium in the pipe, the velocity of the wave front generated by the rupture event is typically greater than the velocity at which a crack is able to propagate through the metallic host pipe. For example, the velocity which a crack propagates through steel pipe varies; from 60 to 250 meters/sec. for ductile steels, and up to 600 meters/sec. for brittle steel. However, the decompression wave front moving through the liquid medium will have a higher velocity; typically greater than 750 meters/sec.

Thus the wave front, i.e., the point of maximum energy owing to the event, quickly passes the location of the crack tip as both move along the longitudinal axis away from the event. After the wave front passes the crack tip, the potential energy that the fluid can apply to the developing crack is much reduced as the energy is derived from the pressure at the wavefront. Thus the stress experienced by the metal host pipe at the crack tip will be provided only by the now-reduced fluid pressure, since the high energy wavefront has passed. The driving mechanism, i.e., sufficient energy to cause the crack to continue to cleave, is removed, and crack propagation ceases.

Figure 21A:
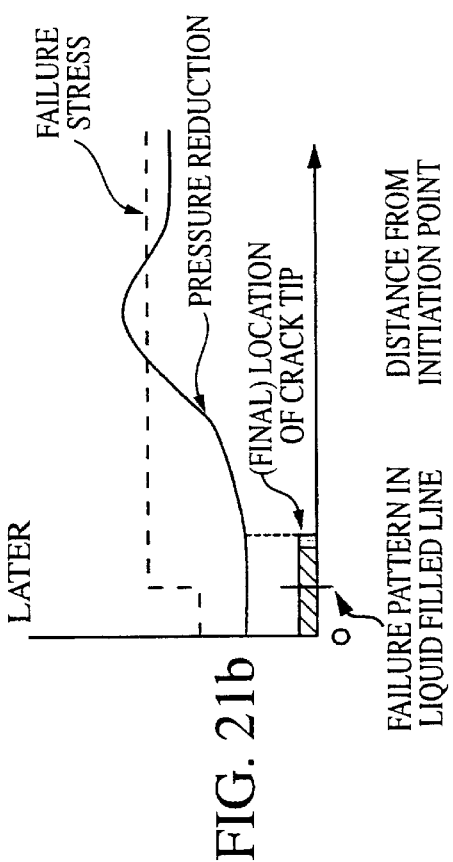
FIGS. 21a and 21b are graphs illustrating crack propagation in a liquid-filled pipeline.
Figure 21B:
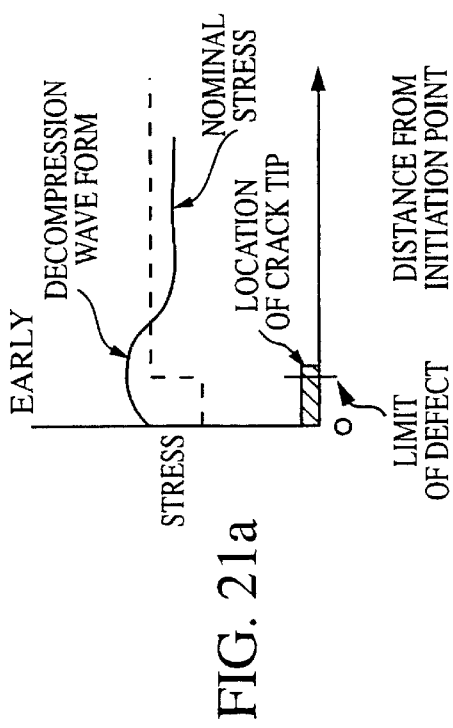

The volume of liquid, a non-compressible Newtonian fluid, lost to the exterior of the system via the crack, creates a general pressure drop in the fluid. Accordingly, the pressure is reduced to less than that required to maintain the propagation process. The rupture event in a liquids pipeline is therefore localized and self-limiting, resulting in a relatively small split in the pipe. This is illustrated in the graphs of FIG. 21.

With a gaseous medium, however, the converse is often true. And, since multi-phase lines, typical to hydrocarbon production, generally contain a substantial amount of gas along with liquid, the following discussion also applies to this mixture as well as gases.

Figure 22A:
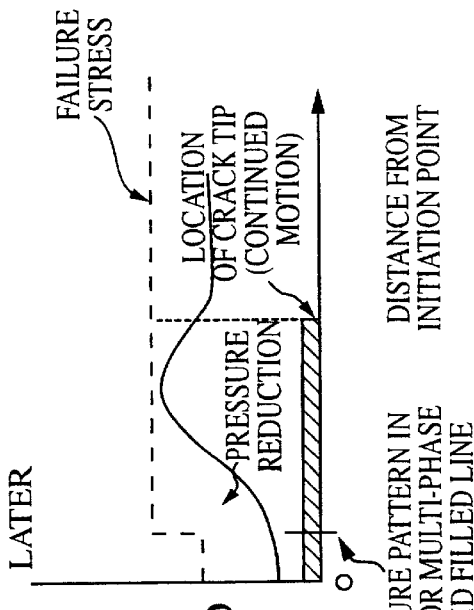
FIGS. 22a and 22b are graphs illustrating crack propagation in a gas-filled or multiphase-fluid-filled pipeline.
Figure 22B:
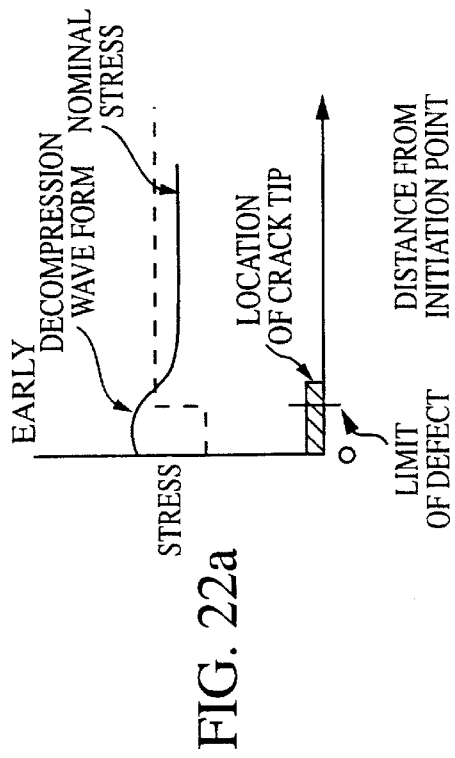

Often, and in particular for brittle steel pipes, the wavefront velocity through gas, e.g., 410 meters/sec through natural gas, is slower than the crack propagation velocity through the metallic host pipe, e.g. 600 mtrs. per second for brittle pipe. In this case, as compared to non-compressible liquids, the high energy wave front lags behind the crack tip as they both move along the pipeline longitudinal axis. The wavefront, therefore, continues to contribute to the cleavage process at the crack tip as it moves as illustrated by the graphs of FIG. 22. The high pressure wave front effectively stays behind the crack and continues to cleave it apart. Additionally, dynamic effects of gas decompression compound the effect, releasing heat, etc. As a result of this increased stress at the crack tip, crack growth in such a gas carrying pipeline will terminate only when a substantially stronger section wall segment of the pipeline is encountered, a section which has enough inherent material strength to halt the process.

In the gas and multi-phase fluid cases, therefore, the crack often runs a long distance, longitudinally or in a spiraling fashion, along the line before halting, usually creating a relatively large rupture (see FIG. 22). In addition to the potential for a massive liquid release through the large rupture, substantial energy is also released in the event. Accordingly, the event is essentially an explosion. Also, the energy release ignites volatile fluids in transit, such as natural gas or other hydrocarbons.

According to the present invention, therefore, annular fluid pressure is reduced to, and maintained at, a level that will not contribute to crack propagation for the nature of the annular fluid under consideration.

Since the host pipe carries virtually all the pressure related stress in a lined piping system, it would be equally over-stressed if it were an unlined pipe. Therefore, in comparing the potential for crack propagation between unlined pipe and lined pipe, according to the invention, extensive propagation in gas and multi-phase pipelines will be prevented in the lined variety whereby annular fluid is manipulated to good effect, according to the present invention.

In one instance, with simultaneous reference to FIGS. 19a and 20a, consider the initiation point of the host pipe failure as directly exterior of the groove space, i.e., it is in contact with gaseous annular fluid only. At the time of crack initiation, since the annular fluid pressure is reduced by the invention, the accompanying decompression wave energy will be very minimal. For example, while the pipe bore pressure may be operating at 100 bar, the annular fluid may be reduced to the order of 1 bar. Thus the level of potential energy available for release from the annular fluid upon expansion is insignificant in comparison to the energy required to initiate the rupture. Notwithstanding, annular pressures of less than 10 bar for ductile steel pipe, and less than 5 bar for brittle steel pipe will be effective in enabling the invention.

By employing the invention, crack propagation behavior will be similar to that experienced in a liquid filled pipeline. Crack propagation will cease in a relatively short time and distance. The instantaneous crack initiation energy dissipates rapidly, having been used up by the event. The growth of the crack will halt when the moving crack tip once again encounters a cross-section in the host pipe material able to withstand the hoop stress, plus the very small pressure wavefront. However, in this case, the energy level is relatively low, owing to the relatively low annular pressure.

This is much preferred to the case, described earlier, where high pressure gas facilitates crack propagation until its tip encounters a section able to withstand both the hoop stress and the relatively high energy incorporated in the high pressure decompression wavefront.

Essentially, the magnitude of the wavefront energy is much reduced by the invention. Although the host pipe continues to experience general hoop stress due to the bore fluid pressure, as transmitted through the liner, it does not directly contact the high pressure gas. Rather, it contacts the low pressure annular gas only, and experiences a minimal level of wavefront energy. Thus, the host pipe does not feel the major impact of a high pressure wavefront, provided the liner retains integrity during the event.

In the second instance, again with reference to FIGS. 19a and 20a, consider the host tubular failure initiation point as located at a point directly in contact with the liner; where essentially the host tubular is not in direct contact with the annular fluid. As the crack initiates, the decompression wavefront will be transmitted through the thermoplastic liner. The velocity of the wavefront through the plastic liner material, typically greater than 800 meters/sec for thermoplastics, is greater than that of the crack propagation through the metallic pipe, e.g. 600 meters/sec.

This is a condition analogous to the liquid annular fluid case discussed previously, and crack propagation will be self-limiting. The crack will grow only for a short time and distance. Since the high energy wavefront will have quickly advanced beyond the crack tip, only the low residual energy trailing the wave remains to contribute to crack tip growth, per FIG. 21. The total level of this energy behind the wave that the host pipe must resist to retain integrity is little different to the static case, i.e., operating pressure alone. The crack will continue to grow therefore, only until it encounters a host pipe wall section that is capable of withstanding the static pressure induced hoop stress; typically a very small distance.

Finally, where the crack initiates at the location defined by the interface of the host pipe, liner, and annular fluid, crack propagation will again be minimal, provided the present invention is employed, as one of the two cases described immediately above will govern.

In all cases, therefore, crack growth potential is limited via the invention. The length of the induced crack in the host pipe will be short, per wave and energy discussions above.

The liner will, therefore, have sufficient structural integrity to bridge over the deficiency of the crack. Such integrity retention will be available for a reasonable period of time, generally sufficient to permit repairs to be effected to the pipeline system, or to allow the line pressure to be reduced to a level which is harmless to both the liner and the host pipe. Thus, the escape of internal fluids into the environment is also prevented.

Accordingly, by manipulating the annular fluid pressure to a non-detrimental level of potential energy for the type of annular fluid involved under the present invention, a dangerous and extensive failure mode is avoided, highly desirable for both safety and environmental reasons.

CONCLUSION

Although embodiments of the invention have been described in detail, the invention is not limited to those embodiments, but rather extends to all modifications, variations, equivalents and other uses within the fair spirit and scope of the invention that would occur to one having the ordinary level of skill in the art.

What is claimed is:

1. A method of treating fluids in an annulus, comprising the steps of:
   providing a fluid-circulation space in an annulus between a host tubular and a liner therein;
   detecting permeation of an undesired fluid through the liner from a bore within the liner, and into the annulus; and then
   circulating a benign fluid through the fluid-circulation space and to the location of said undesired fluid.

2. The method of claim 1, wherein said benign fluid is supplied sufficiently to dilute said undesired fluid.

3. The method of claim 1, wherein said benign fluid reacts with and thereby neutralizes said undesired fluid.

4. The method of claim 1, wherein said benign and undesired fluids are subsequently removed through said fluid-circulation space.

5. The method of claim 1, wherein said benign and undesired fluids are subsequently vented to the exterior of said host tubular.

6. The method of claim 1, wherein said benign and undesired fluids are subsequently removed from the annulus through the interior of said liner.

7. The method of claim 1, wherein the relative proportions of fluid components in the annular fluid, including said undesired fluid, correspond to the relative permeation rates of said fluid components from the bore to the annulus.

8. The method of claim 1, wherein volatile permeating fluid in said liner dissolves in said benign fluid and thereby passes from said liner into said annulus.

9. A method of treating fluids in an annulus, comprising the steps of:
   providing a fluid-circulation space in an annulus between a host tubular and a liner therein;
   detecting an undesired fluid in the annulus; and then
   circulating a benign fluid through the fluid-circulation space and to the location of said undesired fluid;
   wherein said benign fluid reacts with and thereby neutralizes said undesired fluid; and
   wherein said undesired fluid is an acid or a precursor of an acid and said benign fluid reduces an effect of said acid on the host pipe.

10. The method of claim 9, wherein said undesired fluid permeates through the liner from a bore within the liner, and into the annulus.

11. The method of claim 10, wherein the relative proportions of fluid components in the annular fluid, including said undesired fluid, correspond to the relative permeation rates of said fluid components from the bore to the annulus.

12. The method of claim 10, wherein volatile permeating fluid in said liner dissolves in said benign fluid and thereby passes from said liner into said annulus.

13. The method of claim 9, wherein said benign fluid is supplied sufficiently to dilute said undesired fluid.

14. A method of treating fluids in an annulus, comprising the steps of:
   providing a fluid-circulation space in an annulus between a host tubular and a liner therein;
   detecting an undesired fluid in the annulus; and then
   reducing pressure in said annulus sufficiently to reduce the concentration of said undesired fluid to an acceptable level.

15. The method of claim 14, wherein said undesired fluid is in gaseous phase and said pressure-reducing step prevents the fluid from condensing.

16. The method of claim 14, wherein said undesired fluid permeates through the liner from a bore within the liner, and into the annulus.

17. The method of claim 16, wherein the relative proportions of fluid components in the annular fluid, including said undesired fluid, correspond to the relative permeation rates of said fluid components from the bore to the annulus.

18. The method of claim 14, wherein said pressure-reducing step causes volatile permeating fluids to evaporate out of said liner and into said annulus.

19. A method of treating fluids in an annulus, comprising the steps of:
   providing a fluid-circulation annulus between a host tubular and a liner therein; and
   manipulating fluids in said annulus so that the relative proportions of fluid components in the annular fluid correspond to the relative permeation rates of said fluid components from the bore to the annulus.

20. The method of claim 19, further comprising the steps of:
   detecting an undesired fluid in the annulus; and
   manipulating said annular fluids in response to said undesired fluid, so that the relative proportions of fluid components in the annular fluid, including said undesired fluid, correspond to the relative permeation rates of said fluid components from the bore to the annulus.

21. The method of claim 20,
   wherein said undesired fluid has potential for harm to said host tubular; and
   wherein said manipulating step reduces said potential for harm.

22. The method of claim 21, wherein said undesired fluid is in gaseous phase and said pressure-reducing step prevents the fluid from condensing.

23. The method of claim 21, wherein said undesired fluid permeates through the liner from a bore within the liner, and into the annulus.

24. The method of claim 23, wherein said manipulating step causes volatile permeating fluids to evaporate out of said liner and into said annulus.

25. A method of reducing propensity for propagation of cracks in a host tubular, comprising the steps of:
   providing a liner within said host tubular, said liner and host tubular having a fluid-circulating space provided therebetween;
   determining a safe pressure which can be applied by a gaseous or multi-phase fluid to said host tubular without causing substantial propagation of cracks in said host tubular;
   providing a fluid in a bore within said liner at a pressure greater than said safe pressure; and
   manipulating a fluid in said fluid-circulating space so that its pressure is at a level below said safe pressure.

26. A method as in claim 25, wherein said fluid-circulating space is provided by the steps of:
   arranging a spacing structure between said host tubular and the exterior of the liner; and
   arranging said spacing structure in substantially uniform contact with substantially the entire interior of the host tubular.

27. A method of verifying functionality of annular leak detection systems employed in lined tubular systems, comprising the steps of:
   providing one or more fluid-circulating pathways in an annulus between a host tubular and a liner therein;
   circulating fluid through the fluid-circulation pathways, and then
   measuring amounts of said fluid entering and leaving the pathways.

28. A method of increasing structural stiffness of a liner in a tubular system, comprising the steps of:
   providing a liner within a host tubular, said liner and host tubular having a fluid-circulating space provided therebetween;
   determining a safe pressure which can be applied within the annulus without collapsing the liner or rupturing the host tubular;
   providing a fluid in said fluid-circulating space at a pressure level below said safe pressure, and further
   providing said fluid in said fluid-circulating space at conditions enabling an increase of structural stiffness properties of the liner.

29. A method as in claim 28, whereby said annular fluid facilitates said thermoplastic liner in the process of cross-linking.

30. A method as in claim 28, whereby said annular fluid facilitates the leaching of plasticizing constituents from said liner.

31. A method as in claim 28, whereby said annular fluid facilitates the removal of internal bore fluids that have permeated said liner.

32. A method as in claim 28, whereby said annular fluid chemically reacts with said liner to stiffen said liner.

* * * * *